United States Patent
Evosevich et al.

(12) 
(10) Patent No.: US 10,000,294 B2
(45) Date of Patent: *Jun. 19, 2018

(54) AIRCRAFT FUEL TANK FLAMMABILITY REDUCTION METHOD AND SYSTEM

(71) Applicant: The Boeing Company, Chicago, IL (US)

(72) Inventors: Barbara J. Evosevich, Fullerton, CA (US); Ivana Jojic, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/746,310

(22) Filed: Jun. 22, 2015

(65) Prior Publication Data

US 2015/0360170 A1 Dec. 17, 2015

Related U.S. Application Data

(63) Continuation-in-part of application No. 13/594,525, filed on Aug. 24, 2012, now Pat. No. 9,061,249.

(51) Int. Cl.
*B01D 53/22* (2006.01)
*B64D 37/32* (2006.01)
(Continued)

(52) U.S. Cl.
CPC ............ *B64D 37/32* (2013.01); *B01D 53/228* (2013.01); *B01D 67/0067* (2013.01);
(Continued)

(58) Field of Classification Search
CPC .. B64D 37/32; B01D 53/228; B01D 67/0067; B01D 69/08; B01D 71/021;
(Continued)

(56) References Cited

U.S. PATENT DOCUMENTS 2,099,913 A  11/1937  Edouard et al.
3,413,095 A  11/1968  Bramson
(Continued)

FOREIGN PATENT DOCUMENTS

CN  101708776  5/2010
CN  101891017  11/2010
(Continued)

OTHER PUBLICATIONS

Jiao "High performance carbon molecular sieving membranes derived from pyrolysis of metal-organic framework ZIF-108 doped polyimide matrices" Chem. Commun., 2016, 52, 13779-13782.*
(Continued)

*Primary Examiner* — Anthony Shumate
(74) *Attorney, Agent, or Firm* — Parsons Behle & Latimer

(57) ABSTRACT

An aircraft fuel tank flammability reduction method includes feeding pressurized air into an air separation module containing a carbon membrane, the air feed exhibiting a normal pressure of no more than 55 psig. The method includes producing nitrogen-enriched air from the air separation module as a result of removing oxygen from the air feed. An aircraft fuel tank flammability reduction system includes a source for pressurized air, an air separation module configured to receive air feed from the pressurized air source, and a carbon membrane. The carbon membrane is configured to permeate oxygen from the air feed through the carbon membrane at a temperature of at least 120° C. (248° F.) and to produce nitrogen-enriched air from the air separation module as a result of removing oxygen from the air feed.

9 Claims, 2 Drawing Sheets

(51) Int. Cl.
  *B01D 71/02* (2006.01)
  *B01D 69/08* (2006.01)
  *B01D 67/00* (2006.01)

(52) U.S. Cl.
  CPC ............ *B01D 69/08* (2013.01); *B01D 71/021* (2013.01); *B01D 2053/224* (2013.01); *B01D 2256/10* (2013.01); *B01D 2257/104* (2013.01); *Y02T 50/44* (2013.01)

(58) Field of Classification Search
  CPC .......... B01D 2053/224; B01D 2256/10; B01D 2257/104; Y02T 50/44
  See application file for complete search history.

(56) References Cited

U.S. PATENT DOCUMENTS

| | | | |
|---|---|---|---|
| 5,023,276 A * | 6/1991 | Yarrington | C01B 3/382 252/373 |
| 5,101,656 A | 4/1992 | Miller | |
| 5,743,259 A | 4/1998 | Kruse et al. | |
| 6,299,669 B1 | 10/2001 | Koros et al. | |
| 6,425,267 B1 | 7/2002 | Baker et al. | |
| 6,565,626 B1 | 5/2003 | Baker et al. | |
| 6,565,631 B2 * | 5/2003 | Koros | B01D 53/228 55/DIG. 5 |
| 6,656,127 B1 | 12/2003 | Ben-Oren et al. | |
| 6,913,636 B2 | 7/2005 | Defrancesco et al. | |
| 6,997,013 B2 | 2/2006 | Jones | |
| 7,070,941 B2 | 7/2006 | Zhao et al. | |
| 7,081,153 B2 | 7/2006 | Leigh et al. | |
| 7,152,635 B2 | 12/2006 | Moravec et al. | |
| 7,204,868 B2 | 4/2007 | Snow, Jr. | |
| 7,404,844 B2 | 7/2008 | Tin et al. | |
| 7,442,230 B2 | 10/2008 | Snow, Jr. | |
| 7,481,214 B2 | 1/2009 | Biers | |
| 8,245,978 B1 * | 8/2012 | Beers | A62C 3/06 137/88 |
| 8,398,755 B2 | 3/2013 | Coan et al. | |
| 8,623,124 B2 | 1/2014 | Hosseini et al. | |
| 8,709,133 B2 | 4/2014 | Kiyono et al. | |
| 9,061,249 B2 * | 6/2015 | Evosevich | B01D 67/0067 |
| 9,327,243 B2 * | 5/2016 | Jojic | B01D 53/228 |
| 2002/0033096 A1 | 3/2002 | Koros et al. | |
| 2002/0189445 A1 | 12/2002 | Miller et al. | |
| 2004/0025507 A1 * | 2/2004 | Leigh | B64D 37/32 60/608 |
| 2005/0115404 A1 * | 6/2005 | Leigh | B01D 53/0454 95/11 |
| 2005/0235825 A1 | 10/2005 | Tin et al. | |
| 2006/0011063 A1 * | 1/2006 | Zhou | B01D 53/228 96/10 |
| 2007/0157803 A1 | 7/2007 | McNeil et al. | |
| 2008/0210240 A1 * | 9/2008 | Kotliar | A62C 99/0018 128/205.26 |
| 2009/0302163 A1 | 12/2009 | Sanford | |
| 2012/0116249 A1 | 5/2012 | Mcguckin, Jr. | |
| 2012/0304856 A1 * | 12/2012 | Kanetsuki | B01D 63/023 95/47 |
| 2013/0152793 A1 | 6/2013 | Bhuwania et al. | |
| 2014/0000454 A1 | 1/2014 | Singh et al. | |
| 2015/0040984 A1 * | 2/2015 | Ji | F02C 7/25 137/1 |
| 2016/0206995 A1 * | 7/2016 | Rugg | B01D 53/66 |

FOREIGN PATENT DOCUMENTS

| | | |
|---|---|---|
| CN | 102015451 | 4/2011 |
| EP | 2520493 | 11/2012 |
| WO | WO2006079782 | 8/2006 |
| WO | WO2013181407 | 5/2013 |

OTHER PUBLICATIONS

Ismail, et al al: "Understanding the solution-diffusion mechanism in gas separation membrane for engineering students;" Regional Conference on Engineering Education RCEE 2005, Dec. 12-13, 2005, Johor, Malaysia.

Singh, Rauhana, Koros, William J; Carbon Molecular Sieve Membrane Performance Tuning by Dual Temperature Secondary Oxygen Doping (DTSOD); Journal of Membrane Science, vol. 427, pp. 472-478: Jan. 15, 2013.

Vu, De Q., et al; "Mixed matrix membranes using carbon molecular sieves I. Preparation and experimental results;" Journal of Membrane Science 211, pp. 311-334; 2003.

Steel, Keisha, Koros, William; "Investigation of porosity of carbon materials and related effects on gas separation properties;" Carbon 41, pp. 253-266; 2003.

Kim, Youn Kook, et al; "The Gas Separation Properties of Carbon molecular Sieve Membranes Derived from Polyimides Having Carboxylic Acid Groups;" Journal of Membrane Sciences 235; Elsevier; 2004; pp. 139-146.

Williams, P. Jason; et al; "Gas Separation by Carbon Membranes;" Advanced Membrane Technology and Applications; John Wiley & Songs Inc., 2008; pp. 599-627.

Saufi, S.M., et al; "Fabrication of Carbon Membranes for Gas Sepration—A Review;" Carbon 42; Elsevier; 2004; pp. 241-259.

Kiyono, Mayumi, et al; "Effect of Pyrolysis Atmosphere on Separation Performance of Carbon Molecular Sieve Membranes;" Journal of Membrane Science 359; Elsevier; 2010; pp. 2-10.

Hagg, May-Britt, et al; "Carbon Molecular Sieve Membranes: A Promising Alternative for Selected Industrial Applications;" N.Y. Acad. Scie. 984; 2003; pp. 329-345.

Ismail, A.F., David, L.I.B.; "A Review on the latest development of carbon membranes for gas separation;" Journal of Membrane Science 193, pp. 1-18; 2001 May 1, 2001.

International Searching Authority; ISR—WO for Appl No. PCT/US2013/052133 dated Apr. 22, 2014, dated Apr. 22, 2014, 12 pgs.

US Patent and Trademark Office; Office Action for U.S. Appl. No. 13/594,525 dated Jul. 3, 2014, 17 pgs.

Park, Ho Bum, et al., Thermally rearranged (TR) polymer membranes for CO2 separation; Journal of Membrane Science 359, 2010, pp. 11-24 Oct. 14, 2009.

Sanders, David F. et al, "Influence of polyimide precursor synthesis route and ortho-position functional group on thermally rearranged (TR) polymer properties: Pure gas permeability and selectivity;" Journal of Membrane Science 463, 2014, pp. 73-81 Mar. 22, 2014.

Lee, Young Moo; "Thermally Rearranged Polymer Membranes with Cavities: A New Opportunity?," Korea Institute of Energy Technology Planning and Evaluation, Aug. 20, 2008 Aug. 20, 2008.

US Patent and Trademark Office; Office Action for U.S. Appl. No. 13/594,525 dated Jan. 23, 2015, 19 pgs.

Shilu, Fu, et al.; "Carbon molecular sieve membrane structure-property relationships for four novel 6FDA based polyimide precursors" Journal of Membrane Science 487 60-73; Apr. 9, 2015.

Canadian Intellectual Property Office; Office Action for Application No. 2,873,226 dated Sep. 16, 2016.

Thomas L. Reynolds, "Gas Separation Technology: State of the Art", Halon Options Technical Working Conference, pp. 51-63, http://fire.nist.gov/bfrlpubs/fire02/PDF/f02178.pdf, Apr. 26, 2001.

* cited by examiner

AIRCRAFT FUEL TANK FLAMMABILITY REDUCTION METHOD AND SYSTEM

CROSS REFERENCE TO RELATED APPLICATIONS

This application is a continuation-in-part of U.S. patent application Ser. No. 13/594,525, entitled "Aircraft Fuel Tank Flammability Reduction Method and System," and filed on Aug. 24, 2012, which is incorporated herein by reference in its entirety.

TECHNICAL FIELD

The embodiments relate to methods and systems for reducing flammability in aircraft fuel tanks.

BACKGROUND

A variety of known systems exist with the purpose of reducing flammability in aircraft fuel tanks. Such systems may be known by a number of designations including, but not limited to, On-Board Inert Gas Generation System (OBIGGS), Nitrogen Generation System (NGS), Flammability Reduction System (FRS), Fuel Tank Inerting System (FTIS), etc. However, a commonality among the systems involves reducing the oxygen content of fuel tank ullage by feeding inert gas into the fuel tank. Often, the systems produce nitrogen-enriched air (NEA) for the inert gas. Air with lower percent oxygen is less flammable.

Inerting systems used to produce nitrogen-enriched air may rely on pressure swing absorption and desorption from media as a separation mechanism or diffusion through polymer membranes as another separation mechanism to remove oxygen. In systems with polymer hollow fiber membranes, compressed air enters the bore of the polymer hollow fiber and oxygen permeates through the polymer hollow fiber walls. The oxygen permeate is collected and exhausted overboard. The remaining nitrogen-enriched retentate flows through the bore and is collected at the air separation module product gas outlet for distribution to aircraft fuel tanks. Unfortunately, service life of the air separation module and the system operating conditions may be limited by the polymers used in construction of the gas separation module. Accordingly, increased reliability of air separation modules is desirable.

SUMMARY

An aircraft fuel tank flammability reduction method includes feeding pressurized air into an air separation module containing a carbon molecular sieve membrane, the air feed exhibiting a normal pressure of no more than 55 psig. The method includes contacting the carbon molecular sieve membrane with the air feed, permeating oxygen from the air feed through the carbon molecular sieve membrane, and producing nitrogen-enriched air from the air separation module as a result of removing oxygen from the air feed. Nitrogen-enriched air is fed into the fuel tank on board the aircraft.

An aircraft fuel tank flammability reduction method includes feeding pressurized air into an air separation module containing a carbon molecular sieve hollow fiber, the air feed exhibiting a temperature from 120° C. to 195° C. (248° F. to 383° F.) and the carbon molecular sieve hollow fiber exhibiting a selectivity ratio of oxygen permeability to nitrogen permeability of greater than 7.1 and an oxygen permeance of greater than 13 gas permeation units when measured at an operating temperature of 35° C. The method includes contacting the carbon molecular sieve hollow fiber with the air feed, permeating oxygen from the air feed through the carbon molecular sieve hollow fiber, and producing nitrogen-enriched air from the air separation module as a result of removing oxygen from the air feed. The nitrogen-enriched air from the air separation module is substantially cooled in a heat exchanger. The cooled nitrogen-enriched air is fed into the fuel tank on board the aircraft.

An aircraft fuel tank flammability reduction system includes a source for pressurized air, an air separation module configured to receive air feed from the pressurized air source, and a carbon molecular sieve membrane in the air separation module. The carbon molecular sieve membrane is configured to permeate oxygen from the air feed through the carbon molecular sieve membrane at a temperature of at least 120° C. (248° F.) and to produce nitrogen-enriched air from the air separation module as a result of removing oxygen from the air feed. The system includes a fuel tank on board the aircraft and configured to receive the nitrogen-enriched air.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Some embodiments are described below with reference to the following accompanying drawings.

DETAILED DESCRIPTION

Figure 1:
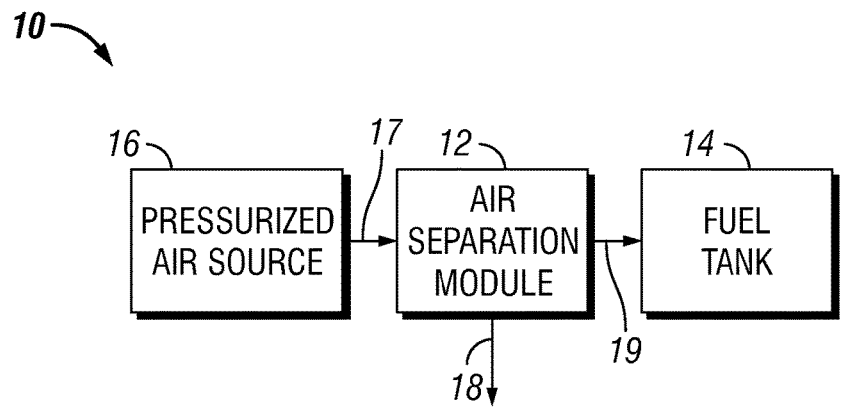
FIGS. 1-4 show diagrams of fuel tank flammability reduction systems according to several embodiments.

Observation indicates that performance and service life of the air separation module and overall system using polymer hollow fiber membranes may be limited by the system operating temperature, operating pressure, pressure difference and pressure ratio across the fibers, tubesheet material properties at operating temperatures, natural relaxation of the fiber, and sensitivity to contaminants.

In further detail, materials used for polymer hollow fiber membranes and tubesheets that support the fiber bundle are polymerized organic compounds containing carbon, hydrogen, oxygen, and possibly other elements. For a given polymer fiber, the range of operating temperature is limited by the fiber performance (selectivity and permeability for a given gas separation pair) and by the materials (especially the tubesheet materials) used to manufacture the separation module. Selectivity is a ratio of permeabilities of a pair of gases. For a given gas separation pair, a tradeoff exists between permeability and selectivity. Namely, the polymeric membrane has an upper bound, known among those of ordinary skill as a Robeson Upper Bound. For a polymer, permeability increases with temperature while selectivity decreases.

For polymeric membranes known in aerospace applications, operating temperature is often less than 96° C. (205° F.). Gas flux through a separation layer within the membrane depends on separation layer thickness (manufacturing dependent), polymer properties (permeability), and operating conditions. The higher the permeability, the lower the membrane area used to produce a given flux at a given difference in partial pressures of a gas across the membrane. Since permeability increases with temperature, the operating temperature limit to achieve desired service life effectively imposes a limit on permeability.

Membrane flux is also affected by the pressure difference across the fiber separation layer. Permeate flux (J) for a hollow tube may be described by the following equation:

$$J=f=2*\pi*L*P((p_1-p_2)/\ln(ID/OD)$$

where L is tube length, P is permeability, p1 and p2 are partial pressures on the respective inside and outside of the tube and ID and OD are respectively inside and outside diameters of the fiber. Flux can, therefore, be increased by increasing the inlet pressure. However, the higher the pressure used by a system, the greater the power and/or air supply demands placed on an aircraft, reducing fuel efficiency.

Thermoset polymers, such as epoxies, are often used for tubesheet materials of known gas separation modules. The tubesheet material secures a bundle of polymer hollow fibers and enables packaging and sealing the bundle into a canister. The maximum operating temperature in known polymer membranes is limited by the manufacturing (such as curing) temperature of the tubesheet material. Even though higher temperature materials exist, the choice of materials that can be manufactured with the hollow fiber membranes and that are practical in aerospace applications are limited in their long term operating temperature to less than 96° C. (205° F.). A system exceeding the temperature limit results in degradation of the tubesheet material and, ultimately, shorter service life of the gas separation module. If a higher temperature thermoset is used, fibers can be damaged during the manufacturing.

Permeability loss may also occur over the operational life of an air separation module using polymer hollow fiber membranes. As with most polymers, physical aging (natural relaxation of the polymer chains) leads to reduction of free volume and loss of permeability and, hence, loss of flux. This change in performance during the service life of the module affects sizing of the system components (such as a heat exchanger). Polymers with high permeability have larger free volume and exhibit more physical aging (unless they are of semi-crystalline morphology). Higher permeability implies less fiber area needed. Therefore, a membrane with high permeability and less physical aging is desired.

In addition, polymer hollow fibers are susceptible to contaminants. Filtration is often used to remove liquids and particulate aerosols. Certain gaseous contaminants can further reduce the permeability and, accordingly, performance and, in sufficient concentration, ultimately affect service life. Condensable gases, depending on their partial pressure in the feed stream and their dew point at the operating temperature, may also deteriorate performance and reduce service life. Because permeability of gaseous contaminants in general also depends on temperature (with the exception of contaminants that chemically react with polymer and/or break polymer chains, such as ozone) and dew point does as well, higher temperature of operation is desired. Increasing the system operating temperature lessens the desire to reduce air feed temperature and, hence, also has positive effects on sizing of system components (smaller heat exchangers and smaller RAM air demands, reducing weight and drag). Higher permeability, however, often increases the feed flow used to reach the desired retentate conditions. To offset that, a membrane with higher selectivity is desired. More nitrogen is therefore retained in the retentate (NEA) and decreases the feed flow rate used.

As a result of the above-described limitations of polymer hollow fibers used as membranes in air separation modules, significant benefits may be obtained by extending service life and also by increasing system operating temperature and/or decreasing system operating pressures. A membrane with higher permeability and higher selectivity is also desired. In addition to higher selectivity, less sensitivity of selectivity to temperature and/or less sensitivity of selectivity to contamination is desired. As described herein, the embodiments provide additional significant benefits. Air separation modules using carbon membranes, such as the carbon molecular sieve (CMS) membranes referenced below in the De Q. Vu, et al. reference, may provide those benefits. The carbon membrane may include a carbon hollow fiber, a spiral wound carbon fiber sheet, a carbon nanotube sheet, or combinations thereof.

Carbon membranes may be produced according to methods known to those of ordinary skill. Carbon membranes may be obtained by pyrolyzing polymer membranes. Carbon membranes may contain at least 80 weight percent (wt %) carbon, such as at least 95 wt %. For example, carbon hollow fibers may contain at least 95 weight percent (wt %) carbon and be obtained by pyrolyzing polymer hollow fibers. Pyrolysis removes much of the hydrogen, oxygen, and other elements and produces an amorphous, microporous structure which, if certain pyrolysis conditions are used, may produce a structure that enables separation of oxygen compared to nitrogen from air with a performance beyond known air separation modules. Carbon hollow fiber membranes have a different structure and transport mechanisms than polymeric hollow fiber membranes. Carbon membranes for gas separation can be made in different forms—as hollow fiber membranes, layers of carbon fibers (spiral wound carbon fiber sheet), or in a form of carbon nanotubes. As known to those of ordinary skill, carbon molecular sieve membranes contain a higher carbon content compared to polymeric membranes and exhibit molecular sieving properties. As such, those of ordinary skill also know that carbon molecular sieve membranes have "slitlike" pores theorized to separate gases using micro-pores of 6-20 Å that provide sorption sites while connected, smaller ultramicropores <6 Å enable molecular sieving. S. Fu et al., *Carbon molecular sieve membrane structure—property relationships for four novel 6FDA based polyimide precursors*, 487 Journal of Membrane Science 60-73, 60 (2015). Accordingly, CMS membranes may be both highly permeable and highly selective with properties lying above the upper-bound limit of polymers. Id.

S. M. Saufi et al., *Fabrication of Carbon Membranes for Gas Separation—A Review*, 42 Carbon 241-259 (2004), describes considerations in forming carbon hollow fibers and other carbon membranes that may be suitable for use in the embodiments herein. De Q. Vu et al., *Mixed matrix membranes using carbon molecular sieves, I. Preparation and experimental results*, 211 J. Membrane Science 311-334 (2003), describes preparation of carbon molecular sieve membranes for gas separations. A. F. Ismail et al., *A Review on the Latest Development of Carbon Membranes for Gas Separation*, 193 J. Membrane Science 1-18 (2001), describes transport mechanisms through the carbon membranes, including carbon hollow fibers. P. Jason Williams et al., *Gas Separation by Carbon Membranes, in Advanced Membrane Technology and Applications* 599-631 (Norman N. Li et al. eds., 2008), further describes considerations in forming carbon hollow fibers and transport mechanisms through carbon membranes. Those of ordinary skill will appreciate from the listed and additional references that carbon membranes may be adapted for use in the embodiments herein producing nitrogen-enriched air.

In an embodiment, an aircraft fuel tank flammability reduction method includes feeding pressurized air into an air separation module containing a carbon membrane. The air feed exhibits a normal pressure of no more than 55 pounds per square inch gauge (psig). The method includes contacting the carbon membrane with the air feed, permeating oxygen from the air feed through the carbon membrane, and producing nitrogen-enriched air from the air separation module as a result of removing oxygen from the air feed. The nitrogen-enriched air is fed into the fuel tank on board the aircraft.

The air feed exhibiting a normal pressure of no more than 55 psig distinguishes the method from known air separation methods using polymer hollow fiber membranes and operating at a higher pressure to provide sufficient oxygen permeation through fiber walls. Though the low pressure may be beneficial, other embodiments herein may also be used when air feed exhibits a higher pressure, such as in a retrofitted system already providing the higher pressure air feed. Such a method is distinguished from known methods in that less active fiber area may be used for the same inlet pressure. That is, higher pressure may allow increased flux and, thus, allow reducing the number of the ASMs used.

"Normal pressure" refers to pressure during cruise; pressure during climb may be somewhat higher. For the present embodiment and other embodiments herein, the air feed may instead exhibit a pressure of no more than 41 psig as a further benefit.

In another embodiment, an aircraft fuel tank flammability reduction method includes feeding pressurized air into an air separation module containing a carbon membrane. The air feed exhibits a temperature of at least 120° C. (248° F.). The method includes contacting the carbon membrane with the air feed, permeating oxygen from the air feed through the carbon membrane, and producing nitrogen-enriched air from the air separation module as a result of removing oxygen from the air feed. The nitrogen-enriched air is fed into the fuel tank on board the aircraft. The air feed exhibiting a temperature of at least 120° C. (248° F.) distinguishes the method from known air separation methods using polymer hollow fiber membranes, which operate at a lower temperature to reduce thermal damage to the polymer material of the membrane and/or tubesheet material.

By way of example, the air feed may exhibit a temperature from 120° C. to 195° C. (248° F. to 383° F.). Permeability of the carbon membrane may be higher at such higher temperatures, while still retaining a selectivity of 3 or greater. The thermal stability of the carbon membrane also allows use of different tubesheet material that does not limit operational temperature of the air separation module.

The method may further include feeding the pressurized air from a source for the pressurized air into the air separation module without substantially cooling the air feed in a heat exchanger. The insubstantial cooling, if any, is of a degree that may occur incidentally from heat loss during mere transmission of the pressurized air from the source to the air separation module. The heat loss may occur in devices intermediate the source and air separation module, such as a filter, but it is less than would occur in a heat exchanger designed to substantially cool the air feed. In known systems, a source for pressurized air generally provides air feed at an elevated temperature and it is cooled in a heat exchanger to less than 96° C. (205° F.) normal operating temperature to reduce thermal damage to polymer hollow fibers and/or tubesheet material. Under a "normal operating temperature" allowed by known shutdown mechanisms, transient excursions to higher temperature may occur.

In the methods herein, a heat exchanger may be reduced in cooling capacity (and thus reduced in size), if some cooling is warranted. Or the heat exchanger may be eliminated, if air feed temperature is within tolerance of the thermal stability for a given carbon membrane. Reducing or eliminating cooling may beneficially increase permeability due to increased thermal energy of the oxygen.

Although there may be benefits to the air feed exhibiting a temperature of up to 195° C. (383° F.), it may be desired to cool the nitrogen-enriched air. Accordingly, the method may further include cooling the nitrogen-enriched air in a heat exchanger before feeding the nitrogen-enriched air from the air separation module into the fuel tank to comply with fuel tank structural and transport element criteria.

In an embodiment, an aircraft fuel tank flammability reduction system includes a source for pressurized air and an air separation module configured to receive air feed from the pressurized air source. A carbon membrane is in the air separation module. The carbon membrane is configured to permeate oxygen from the air feed through the carbon membrane at a temperature of at least 120° C. (248° F.) and to produce nitrogen-enriched air from the air separation module as a result of removing oxygen from the air feed. The system includes a fuel tank on board the aircraft and configured to receive the nitrogen-enriched air.

In another embodiment, an aircraft fuel tank flammability reduction system includes a source for pressurized air and an air separation module configured to receive air feed from the pressurized air source. A carbon membrane is in the air separation module. The carbon membrane is configured to permeate oxygen from the air feed through the carbon membrane at a normal pressure of no more than 55 psig and to produce nitrogen-enriched air from the air separation module as a result of removing oxygen from the air feed. The system includes a fuel tank on board the aircraft and configured to receive the nitrogen-enriched air.

By way of example, the carbon membrane may be configured to permeate oxygen from the air feed through the carbon membrane at a temperature from 120° C. to 195° C. (248° F. to 383° F.). The system may lack a cooling heat exchanger downstream of the pressurized air source before the air separation module. The system may further include a heat exchanger configured to cool substantially the nitrogen-enriched air from the air separation module and to provide cooled nitrogen-enriched air into the fuel tank. Temperature control of the air feed and/or nitrogen enriched air may provide the benefits described above.

The carbon membrane may exhibit a selectivity ratio of oxygen permeability to nitrogen permeability of at least 9 when measured at an operating temperature of 160° F. Instead, selectivity ratio may be greater than 7.1, such as greater than 7.5, when measured at an operating temperature of 35° C. (95° F.). Also, the carbon membrane may exhibit an oxygen permeance of at least 80 gas permeation units (GPU) when measured at an operating temperature of 160° F. Instead, oxygen permeance may be greater than 13 GPU, such as greater than 30 GPU, when measured at an operating temperature of 35° C. (95° F.). Even though some of the embodiments herein operate at higher than 160° F., such temperature provides a convenient test temperature for comparing temperature dependent parameters of selectivity ratio and permeance. Further, the carbon membrane may have an operational surface area that is at least 50% less than an operational surface area of a polymer hollow fiber membrane operating under the same conditions and producing the same nitrogen-enriched air output. Still further, the carbon membrane may exhibit a service life that is at least 1.5 times a service life of a polymer hollow fiber membrane operating under the same conditions and producing the same nitrogen-enriched air output. The use of a carbon membrane, such as a carbon hollow fiber membrane, may beneficially provide the described features. Instead of the properties of the carbon membrane alone providing the described features, they may result from operating at a higher temperature permitted by the carbon membrane compared to the limited operating temperature of a polymer hollow fiber membrane, in keeping with the descriptions above.

Accordingly, in a further embodiment, an aircraft fuel tank flammability reduction method includes feeding pressurized air into an air separation module containing a carbon molecular sieve hollow fiber. The air feed exhibits a temperature from 120° C. to 195° C. (248° F. to 383° F.). The hollow fiber exhibits a selectivity ratio of oxygen permeability to nitrogen permeability of greater than 7.1 and a permeance of greater than 13 gas permeation units when measured at an operating temperature of 35° C. The method includes contacting the carbon molecular sieve hollow fiber with the air feed, permeating oxygen from the air feed through the carbon molecular sieve hollow fiber, and producing nitrogen-enriched air from the air separation module as a result of removing oxygen from the air feed. The nitrogen-enriched air from the air separation module is substantially cooled in a heat exchanger. The cooled nitrogen-enriched air is fed into the fuel tank on board the aircraft. By way of example, the air feed may exhibit a normal pressure of no more than 55 psig.

FIG. 1 shows a diagram of a portion of an aircraft fuel tank flammability reduction system 10 according to an embodiment. System 10 includes an air separation module 12 including a carbon membrane that receives air feed 17 from a pressurized air source 16. Module 12 produces a permeate gas 18 containing mostly oxygen and a retentate gas (nitrogen-enriched air 19). A fuel tank 14 receives nitrogen-enriched air 19 to provide flammability reduction.

Figure 2:
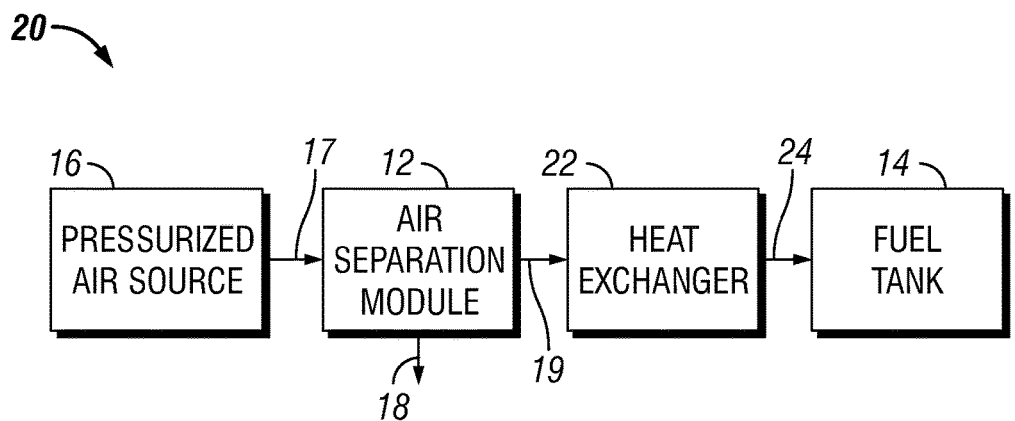

FIG. 2 shows a diagram of a portion of an aircraft fuel tank flammability reduction system 20 according to another embodiment. System 20 includes the components of system 10 shown in FIG. 1 and further includes a heat exchanger 22 that provides cooled nitrogen-enriched air 24. System 20 may be used in the circumstance where no substantial cooling of air feed 17 is warranted upstream of air separation module 12, but a desire exists to reduce heating of fuel tank 14 with cooled nitrogen-enriched air 24.

Figure 3:
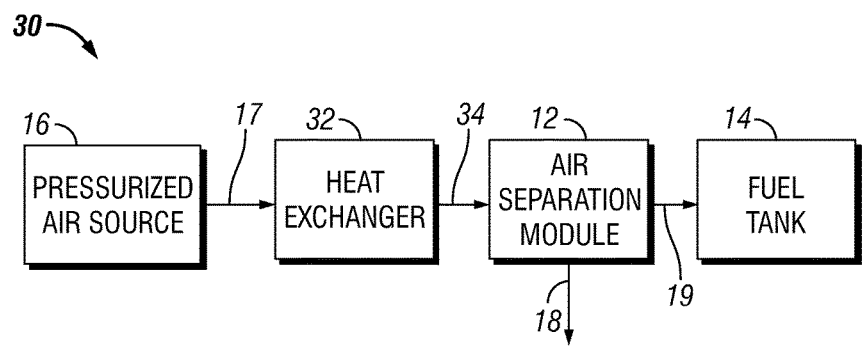

FIG. 3 shows a diagram of a portion of an aircraft fuel tank flammability reduction system 30 according to an additional embodiment. System 30 includes the components of system 10 shown in FIG. 1 and further includes a heat exchanger 32 that provides cooled air feed 34. System 30 may be used in the circumstance where some cooling of air feed 17 is warranted upstream of air separation module 12. As described above, heat exchanger 32 may exhibit a cooling capacity less than a cooling capacity used for known heat exchangers providing cooled air feed to an air separation module using a polymer hollow fiber membrane instead of the carbon membrane of module 12.

Figure 4:
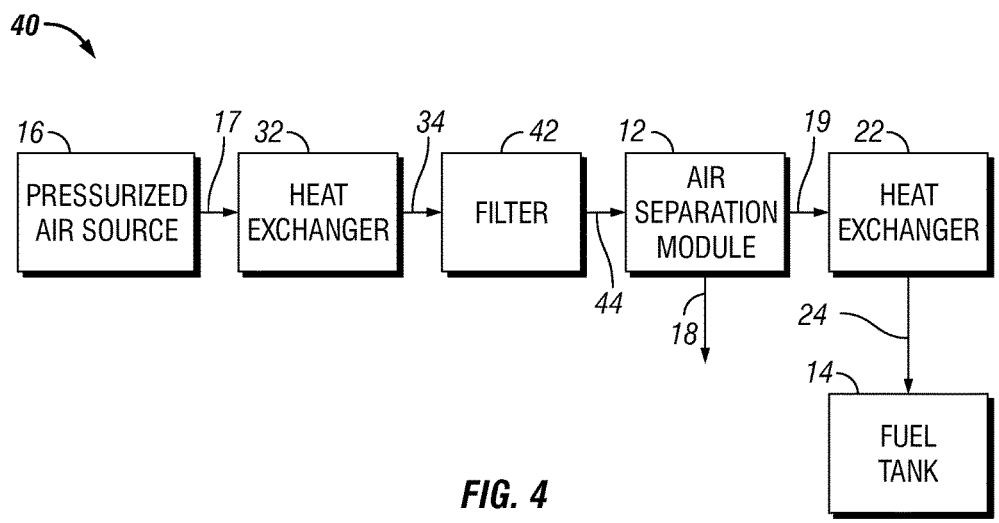

FIG. 4 shows a diagram of a portion of an aircraft fuel tank flammability reduction system 40 according to a further embodiment. System 40 includes the components of system 10 shown in FIG. 1 and further includes heat exchanger 22 of FIG. 2 and heat exchanger 32 of FIG. 3. Accordingly, system 40 may be used to cool air feed 17 to a desired temperature for module 12 and also to cool nitrogen-enriched air 19 for fuel tank 14. System 40 also includes a filter 42 that provides filtered air feed 44. Even though module 12 includes a carbon membrane that is less susceptible to contaminants compared to polymer hollow fiber membranes, filter 42 may be provided either downstream (as shown) or upstream of heat exchanger 32 to remove contaminants potentially detrimental to module 12.

Although FIGS. 1-4 show various possible embodiments of systems described herein, it will be appreciated that further combinations of the features in FIGS. 1-4 and other features described herein are contemplated.

Operating at a lower inlet pressure may allow use of engine bleed air without further pressurization. Lower inlet pressure may eliminate or reduce known use of turbo compressors or electrically driven compressors upstream of the air separation module. Alternatively, the option exists to use alternate feed air from a lower pressure source and an electrically driven compressor. Properties of the carbon membrane may allow use of a lower pressure source and/or a lower pressure ratio compressor (smaller size and/or lower power, for example).

The increased efficiency in separation of oxygen from air results in less feed air to obtain the same amount of nitrogen-enriched air. Less feed air yields increased aircraft fuel efficiency. More efficient separation also permits the air separation module to be smaller in size and lighter in weight.

Permeability of both carbon hollow fibers and known polymer hollow fibers increases with higher temperature. Carbon fibers are able to withstand higher operating temperature during manufacturing, which enables use of higher temperature tubesheet materials with higher thermal stability than known tubesheet materials (often epoxies) used in the gas separation industry. Higher operating temperature enables design of a lighter weight system via two means: (1) higher performance enables less surface area of active fiber (smaller air separation module or fewer modules per aircraft) and (2) less inlet heat exchanger capacity (use of a smaller inlet heat exchanger or no inlet heat exchanger). Weight reduction compared to polymer hollow fiber membrane systems may be as much as 30%.

In addition, higher thermal stability materials with beneficial mechanical properties can be used in the air separation module design and the life of the unit can be extended beyond the known modules, which increases reliability and decreases maintenance cost of the system.

Carbon hollow fiber membranes offer increased performance over polymer hollow fiber membranes at a given module inlet-to-outlet pressure ratio (where outlet is the permeate outlet for the oxygen permeating through the membrane walls, which is generally exhausted overboard in airplane applications). This is expected to result in an even more weight savings, higher fuel economy, and more reliability.

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

TABLE OF REFERENCE NUMERALS FOR FIGURES 10 system
12 air separation module 14 fuel tank
16 pressurized air source
17 air feed
18 permeate gas
19 nitrogen-enriched air
20 system
22 heat exchanger
24 cooled nitrogen-enriched air
30 system
32 heat exchanger
34 cooled air feed
40 system
42 filter
44 filtered air feed

The invention claimed is:

1. An aircraft fuel tank flammability reduction method comprising:
    feeding pressurized air into an air separation module containing a carbon molecular sieve membrane, the air feed exhibiting a normal pressure of no more than 55 psig and the carbon molecular sieve membrane containing at least 80 weight percent carbon;
    contacting the carbon molecular sieve membrane with the air feed, permeating oxygen from the air feed through the carbon molecular sieve membrane, and producing nitrogen-enriched air from the air separation module as a result of removing oxygen from the air feed; and
    feeding the nitrogen-enriched air into the fuel tank on board the aircraft.

2. The method of claim 1 wherein the carbon molecular sieve membrane comprises a carbon hollow fiber, a spiral wound carbon fiber sheet, a carbon nanotube sheet, or combinations thereof.

3. The method of claim 1 wherein the carbon molecular sieve membrane comprises a pyrolyzed polymer hollow fiber.

4. The method of claim 1 wherein the air feed exhibits a temperature of at least 120° C. (248° F.).

5. The method of claim 1 wherein the air feed exhibits a temperature from 120° C. to 195° C. (248° F. to 383° F.).

6. The method of claim 1 further comprising feeding the pressurized air from a source for the pressurized air into the air separation module without substantially cooling the air feed in a heat exchanger.

7. The method of claim 1 further comprising substantially cooling the nitrogen-enriched air in a heat exchanger before feeding the nitrogen-enriched air from the air separation module into the fuel tank.

8. An aircraft fuel tank flammability reduction method comprising:
    feeding pressurized air into an air separation module containing a carbon molecular sieve hollow fiber, the air feed exhibiting a temperature from 120° C. to 195° C. (248° F. to 383° F.) and the carbon molecular sieve hollow fiber exhibiting a selectivity ratio of oxygen permeability to nitrogen permeability of greater than 7.1 and an oxygen permeance of greater than 13 gas permeation units when measured at an operating temperature of 35° C. and the carbon molecular sieve membrane containing at least 80 weight percent carbon;
    contacting the carbon molecular sieve hollow fiber with the air feed, permeating oxygen from the air feed through the carbon molecular sieve hollow fiber, and producing nitrogen-enriched air from the air separation module as a result of removing oxygen from the air feed;
    substantially cooling the nitrogen-enriched air from the air separation module in a heat exchanger; and
    feeding the cooled nitrogen-enriched air into the fuel tank on board the aircraft.

9. The method of claim 8 wherein the air feed exhibits a normal pressure of no more than 55 psig.

* * * * *